United States Patent [19]

Rimdzius

[11] 4,332,015

[45] May 25, 1982

[54] REMOTE TEMPERATURE-PRESSURE RECORDING SYSTEM

[75] Inventor: Donald A. Rimdzius, Carol Stream, Ill.

[73] Assignee: The Continental Group, Inc., New York, N.Y.

[21] Appl. No.: 27,330

[22] Filed: Apr. 5, 1979

[51] Int. Cl.³ .................... G11C 11/40; G11C 13/00
[52] U.S. Cl. ........................................ 365/45; 365/73
[58] Field of Search ....................... 365/45, 46, 48, 73, 365/74, 75

[56] References Cited

U.S. PATENT DOCUMENTS

| | | | |
|---|---|---|---|
| 2,787,418 | 4/1957 | MacKnight | 365/45 |
| 3,914,748 | 10/1975 | Barton et al. | 365/73 |
| 4,024,512 | 5/1977 | Amelio et al. | 365/45 |
| 4,130,894 | 12/1978 | Merrill et al. | 365/73 |

*Primary Examiner*—Terrell W. Fears
*Attorney, Agent, or Firm*—Joseph G. Seeber; Charles E. Brown; Joseph E. Kerwin

[57] ABSTRACT

A remote recording and playback system comprises a recording unit for recording analog data received virtually simultaneously over a plurality of analog input channels, and a playback unit for playing back said recorded analog data for a given one of the plurality of analog input channels. The recording unit sequentially scans the plurality of analog input channels in succession to derive respective analog data samples, converts the respective analog data samples to digital form, and stores the digital representations of the analog data samples in a random access memory. The playback unit accesses the random access memory in the recording unit, converts the digital representations derived therefrom to analog signals, and displays the previously recorded analog data, one channel at a time. The system is further characterized by the storage and retrieval of "drift" and D.C. offset data, visual display by the playback unit of the channel number for which digital data is being displayed, and recharging of the recording unit by the playback unit during connection thereto (for example, during playback).

48 Claims, 7 Drawing Figures

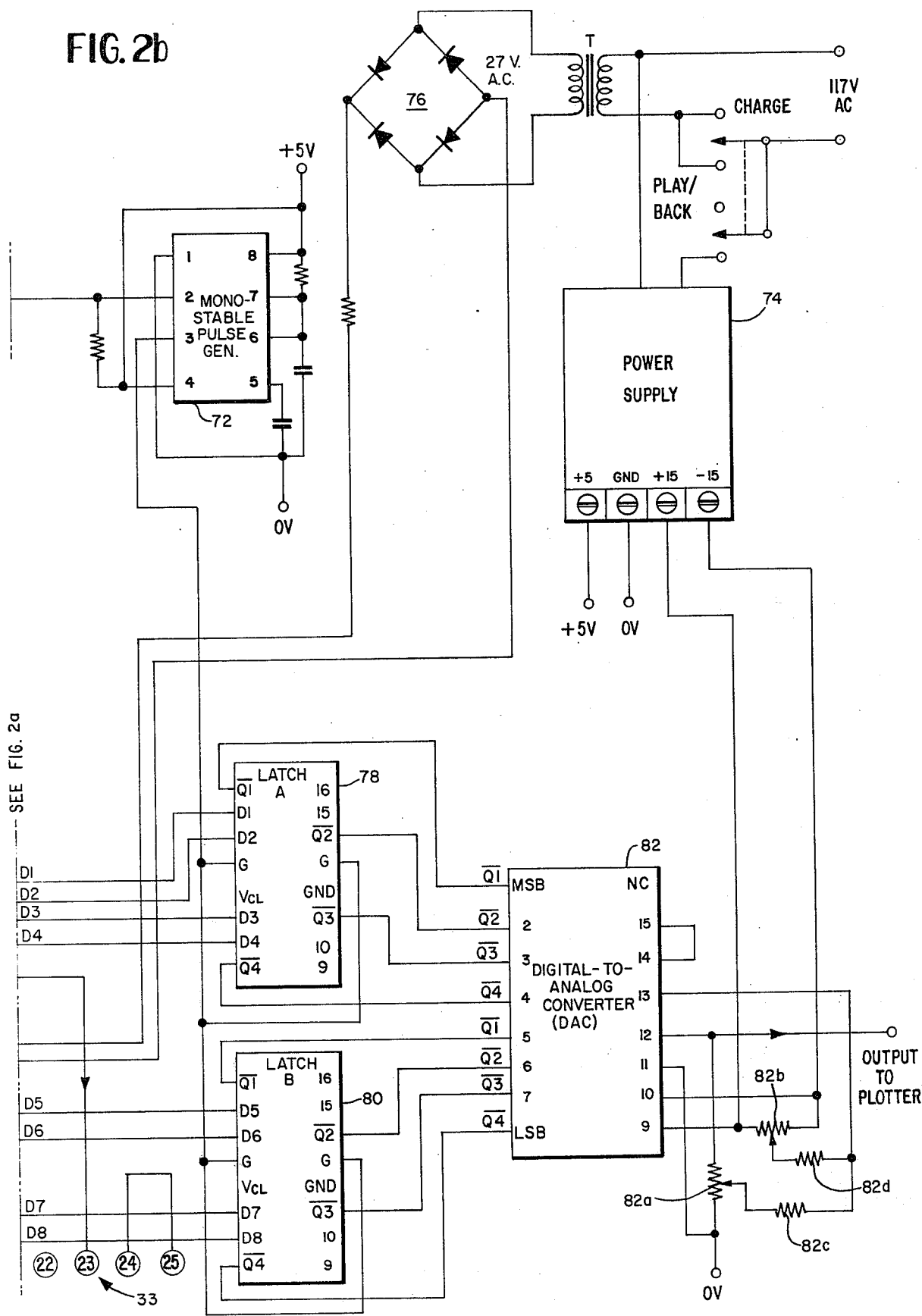

REMOTE TEMPERATURE-PRESSURE RECORDING SYSTEM

BACKGROUND OF THE INVENTION

1. Field of the Invention

The present invention relates to a remote temperature-pressure recording system and, more particularly, a system for recording with respect to time, temperature or other analog voltage information (such as a signal from a pressure transducer), as received over a plurality of analog input channels, and for playing back the recorded information, one channel at a time, for display (typically, on an X-Y plotter).

2. Description of the Prior Art

In certain industrial applications—for example, in those applications involving the maintenance of carefully controlled (temperature-controlled, pressure-controlled, etc.) environmental conditions—it has been desirable to employ thermocouples and other measuring devices for the purpose of recording the environmental conditions within certain otherwise inaccessable places (such as, ovens, pasteurizers, etc.).

In such industrial applications, several problems have presented themselves. Firstly, it has been considered desirable to record, with respect to time, more than just one or two environmental parameters during the carrying out of the particular industrial process. Moreover, it has been considered desirable to record the plurality of environmental parameters, with respect to time, on a single device.

Furthermore, it has been recognized that certain environmental parameters, in the course of an industrial process, change more rapidly than others. Accordingly, insofar as measurement of these various environmental parameters is concerned, it has been considered desirable to equip such recording units with the capability of operator adjustment of sampling rate (that is, the frequency or lack of frequency with which the analog voltage information is to be sampled and recorded), and preadjustment to accomodate either extremely high or extremely low range parameter values.

Since, in many such industrial applications, it is necessary for the same parameter (such as, for example, temperature) to be measured at different stages along the path of a particular product or item as it moves through an industrial process, it is considered desirable to develop a recording unit which is not only small and insulated from the environmental conditions, but also battery operated, thus precluding the necessity of wires trailing as the device moves through the industrial process.

Inasmuch as various electric circuits, especially measuring circuits, are adversely influenced by "drift" or D.C. offset in the electrical system, it is also considered desirable to record, at prescribed intervals, a zero-voltage value, which value can be later examined to determine the effect of "drift" or D.C. offset on the measurements of the parameters over time.

Furthermore, whereas (on the one hand) it is considered desirable to have a single device comprising the recording and playback units of the recording system, it is (on the other hand) desirable to avoid subjecting both the recorder unit and the playback unit to the environmental conditions which must necessarily be experienced by the recorder unit as it moves through an industrial process recording data therein. Accordingly, it is considered desirable to have separate recorder and playback units which, however, may be joined—for example, by a plug connection—during the post-process period so as to facilitate playback of the recorded data, and display thereof.

Moreover, since—after each recording period during the industrial process—it will be necessary to recharge the battery of the battery-powered recorder unit, it would be desirable to accomplish this recharging of the recorder unit's batteries not only during a normal recharging period, set aside for that purpose, but also during the "playback" phase of operation, that is, during that time period when the recorder unit is "plugged into" the playback unit for the purpose of playback of data previously recorded.

Finally, it would be desirable to equip the playback unit with the capability of displaying, during playback, via a display unit separate from the data display, the particular channel for which the data is currently being played back.

SUMMARY OF THE INVENTION

Therefore, according to the present invention, there is provided a remote recording and playback system, generally comprising a recorder unit for recording analog data received virtually simultaneously over a plurality of analog input channels, and a playback unit for playing back the recorded analog data for each particular channel, one channel at a time.

More specifically, the present invention provides a recording unit having an analog input channel scanner for sequentially scanning a plurality of analog input channels in succession to derive respective analog data samples therefrom, an analog-to-digital converter (ADC) for converting the analog data samples to digital representations thereof, and a random access memory for receiving and storing the digital representations of the analog data samples from the sequentially scanned analog input channels.

The remote recording unit of the invention is provided with clock circuitry for controlling the scanning rate (insofar as the scanning of the analog input channels is concerned) and the conversion rate (insofar as analog-to-digital conversion is concerned). Moreover, the recorder unit is provided with an operator-actuable switch for selecting a scanning rate from among a variety of available scanning rates, thus affording the operator of the recording unit the ability to set a scanning rate appropriate for the particular environmental parameters being measured.

In a preferred embodiment of the invention, a final stage of the analog input channel scanner is not connected to an input channel. Rather, the circuitry of the final stage of the analog input channel scanner is connected so that, during a final selection period or scanning time—during which that particular stage is selected for input of sampled data to the ADC and random access memory (RAM)—a "short circuit" condition is created at the output of the final stage of the scanner network, thus providing to the ADC and RAM a "zero value" measurement. Upon subsequent playback of recorded data, this "zero value" measurement can be of use to the system operator in evaluating whether or not, and to what extent, "drift" or D.C. offset have affected the measurement/recording of data by the recording unit.

In accordance with the present invention, the playback unit generally comprises circuitry for accessing the RAM in the recording unit (via a plug-type connection provided between the two units), a digital-to-analog converter (DAC) for converting the digital representations read out of the RAM to analog signals, and display circuitry for providing a visual display (via, for example, an X-Y plotter, chart recorder, etc.) of the recorded analog data, such recorded analog data being displayed one channel at a time.

Moreover, during the playback phase of operation of the system, the playback unit—via its connection to the recorder unit by means of the plug-type connection previously mentioned—is equipped with the necessary circuitry to recharge the battery of the recorder unit.

Finally, the playback unit is equipped with a second display device (for example, a 7-segment tube-type display device) for visually displaying, and identifying, the particular channel for which recorded data is being played back.

Therefore, it is an object of the present invention to provide a remote recording and playback system comprising a unit for recording analog data received virtually simultaneously over a plurality of analog input channels, and a playback unit for playing back the recorded analog data for a selected one of the plurality of analog input channels.

It is an additional object of the present invention to provide a recording unit having the capability of operator-control of scanning rates, in accordance with which analog data appearing over each of the plurality of analog input channels is scanned, sampled and recorded.

It is an additional object of the present invention to provide a recording unit which is not only small and insulated from environmental conditions, but also battery-operated.

It is an additional object of the present invention to provide a recording unit which samples and records, at a prescribed time interval, zero voltage input data, thus leading to the capability of subsequent evaluation of the effect of "drift" D.C. offset on the recorded data during measurement.

It is a further object of the present invention to provide a playback unit which is separable from the recording unit, but which can be joined (as by a plug-type connection) to the recording unit for the purpose of playing back recorded data.

It is a further object of the present invention to provide a playback unit which, when connected to the recorder unit (such as for the purpose of playback), recharges the battery of the recorder unit.

Finally, it is an object of the present invention to provide a playback unit having a second display device (such as, for example, a 7-segment tube-type display) for visually indicating the identity of the particular channel with respect to which recorded data is being played back.

With the above and other objects in view that will hereinafter appear, the nature of the invention will be more clearly understood by reference to the following description, the appended claims, and the accompanying drawings.

BRIEF DESCRIPTION OF DRAWINGS

FIGS. 2a–2b are diagrammatic representations of a preferred embodiment of the playback unit of the remote temperature-pressure recording system of the invention.

DETAILED DESCRIPTION

The invention of the application will now be more fully described with reference to FIGS. 1a–1e, which are diagrammatic representations of a preferred embodiment of the recording unit of the remote temperature-pressure recording system of the invention.

As mentioned earlier, the remote temperature-pressure recording unit is a self-contained, battery-powered data acquisition device capable of recording (with respect to time) a plurality of channels (seven, in the preferred embodiment) of the analog voltage information.

Figure 1A:
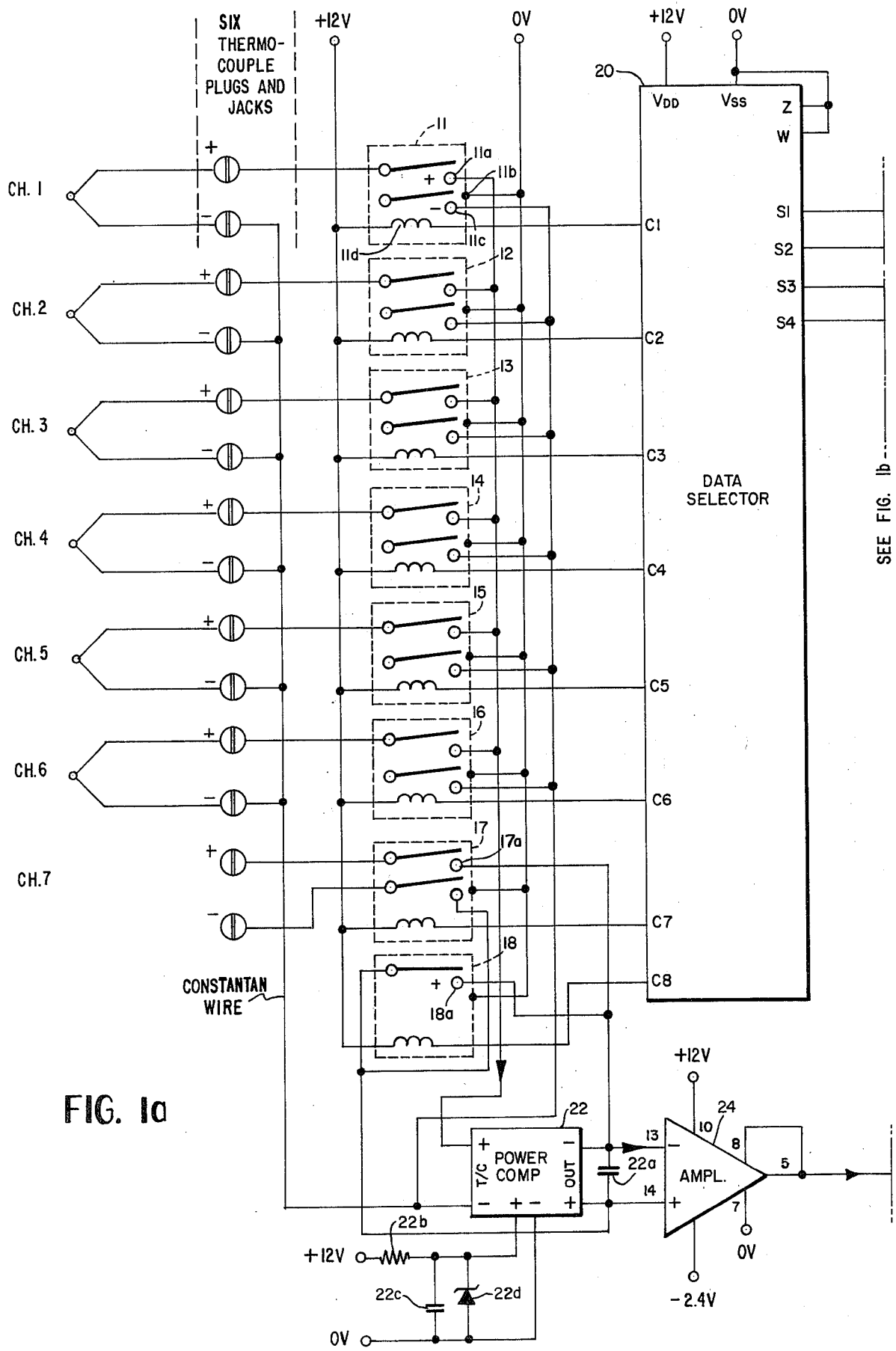
FIGS. 1a–1e are diagrammatic representations of a preferred embodiment of the recording unit of the remote temperature-pressure recording system of the invention.

The recording unit basically comprises the following elements: an input section (generally shown in FIG. 1a) consisting of seven input channels CH1–CH7, a plurality of low thermal reed relays 11–18 (forming a channel scanner), a data selector 20 for controlling consecutive actuation of respective ones of the thermal reed relays 11–18, and a power compensator 22 and amplifier 24 for providing power compensation and amplification, respectively, of the analog data read into the recording unit by each respective one of the relays 11–18; a processing section (generally shown in FIG. 1b) comprising an op amp 26 for further amplifying the analog data from amplifier 24 prior to digital conversion, an analog-to-digital converter (ADC) 28 for converting the analog data to digital form, and a low-to-high voltage level shifter 30 for performing level shifting of data selection signals prior to provision of such signals to data selector 20 (FIG. 1a); a storage section (generally shown in FIG. 1c) comprising a plurality of random access memories (RAM) 32 for storing the received data after conversion to digital form, a plurality of hex buffers 34 for receiving counter output signals and providing same both to the low-to-high voltage level shifter 30 (FIG. 1b), as data selection signals, and to the RAM 32 (FIG. 1c), as memory address inputs, and further hex buffers 36, 38 and 40 for receiving and conditioning end-of-conversion signals from ADC 28, and for passing such signals to the RAM 32; an addressing section (generally shown in FIG. 1d) comprising a 12-bit addressing counter 42 and associated hex buffers 44 for providing further address input to the RAM 32 (FIG. 1c); and a synchronization section (generally shown in FIG. 1e) comprising a system clock generator 46 for providing a main system clock for the recording unit, and associated selection switches 48 for selection of the system clock pulse rate, and thus, the scanning or sampling rate of the low thermal reed relays 11–18 (FIG. 1a).

As mentioned earlier, the remote temperature-pressure recording unit records temperature or other analog voltage information, such as a signal from a pressure transducer, with respect to time. Referring to the input section of FIG. 1a, whereas the seven channels CH1–CH7 can accommodate any combination of thermocouples and thermocouple-compatible analog voltage information—such as that generated by pressure transducers—channels CH1–CH6 are shown as accommodating thermocouple inputs, while channel CH7 is shown as accommodating a pressure transducer. In the preferred embodiment, positive terminals are connected to channels by copper wire, while negative terminals are connected to the channels by constantan wire.

In operation, the seven channels of input information are sampled by an input channel scanner network made up of low thermal reed relays 11–18. When a particular thermocouple input, such as that received over channel CH1, is being sampled by a particular relay, such as relay 11, the analog voltage received over the channel will be impressed across a thermocouple reference junction consisting of, in the example, positive terminal 11a and reference terminal 11c (the latter being connected to the negative of compensator 22). The analog voltage impressed across the thermocouple reference junction of each of the relays 11–16 is provided as a positive input to power conpensator 22, the negative input of which is connected to a negative terminal of each of the relays 11–16 (such as, for example, negative terminal 11c of relay 11).

The channel scanner network made up of relays 11–18 operates in a time-multiplexed fashion under the control of data selector 20. More specifically, data selector 20, under the control of certain data selector inputs or data selection signals S1–S4 (to be discussed below), successively actuates—via terminals C1–C8 of data selector 20—a solenoid in each respective one of relay 11–18 (such as, for example, solenoid 11d in relay 11). In this manner, data selector 20—via selective actuation of relays 11–16—causes sequential application of analog voltage information from channels CH1–CH6 to the input terminals of power compensator 22. It should be noted that, in contrast, terminal 17a is connected to the negative terminal (13) of amplifier 24.

Thus, data selector 20 performs selective actuation of relays 11–18 (via output terminals C1–C8) in response to data selection inputs provided at terminal S1–S4 of data selector 20 (such data selection inputs originating in a manner to be described below). Data selector 20 is powered by D.C. supply voltages $V_{DD}$ and $V_{SS}$—in the preferred embodiment, +12 V. and 0 V. as shown. Whereas any data selector which performs the above-outlined functions may be employed, data selector 20 is, for example, preferably a Dual 4-Channel Analog Data Selector MC14529B (manufactured by Motorola Semiconductors of Phoenix, Arizona).

Power compensator 22 is a conventional device for providing stable, accurate secondary thermocouple junctions at any desired temperature, thus providing automatic compensation for ambient temperature changes. Power compensator 22 is externally energized (in the preferred embodiment) by a +12 V. source of D.C. voltage, connected to power terminals of the compensator 22 via a voltage regulating network comprising resistor 22b, capacitor 22c, and tunnel diode 22d, as shown. Power compensator 22 is, for example, implemented by Thermocouple Reference Junctions NC140, 143 or 240 (manufactured by Hades Manufacturing Corporation of Farmingdale, New York).

The output of power compensator 22 is provided to amplifier 24, wherein amplification of each successively received channel input is accomplished. In the preferred embodiment, amplifier 24 is a low-drift instrumentation amplifier—that is, basically, a closed-loop gain block which exhibits high input impedance and high common-mode rejection characteristics. For example, amplifier 24 can be implemented by Low-drift Instrumentation Amplifier No. 3626 (manufactured by Burr-Brown of Tucson, Arizona). However, any conventional amplifier having similar characteristics may be employed.

Finally, returning to consideration of low thermal reed relays 11–18, it will be noted that thermal reed relay 18 is not identical in structure to relays 11–17. Relay 18 has its positive terminal 18a connected to both the negative output terminal and the positive output terminal of power compensator 22, there being a capacitor 22a connected between the respective negative and positive output terminals of power compensator 22 for the purpose of noise suppression. Thus, when data selector 20 actuates reed relay 19 during the eighth (last) selection cycle, capacitor 22a is effectively short-circuited by the electrical connection of the negative and positive terminals of power compensator 22. Thus, the negative and positive input terminals 13 and 14 of amplifier 24 are also short-circuited, and this "short circuit" condition at the input of amplifier 24 during the last selection period of data selector 20 causes a "zero" input to be processed in the processing stage of FIG. 1b (in a manner to be described), and a digital representation of the "zero" input is then stored in RAM 32 of FIG. 1c. As a result, any drift or D.C. offset experienced by the system is recorded in the eighth, sixteenth, etc. locations in RAM 32, which eighth, sixteenth, etc. locations are provided for that purpose. Such drift or D.C. offset will appear when data is "played back" from the RAM 32, and may accordingly be evaluated.

Figure 1B:
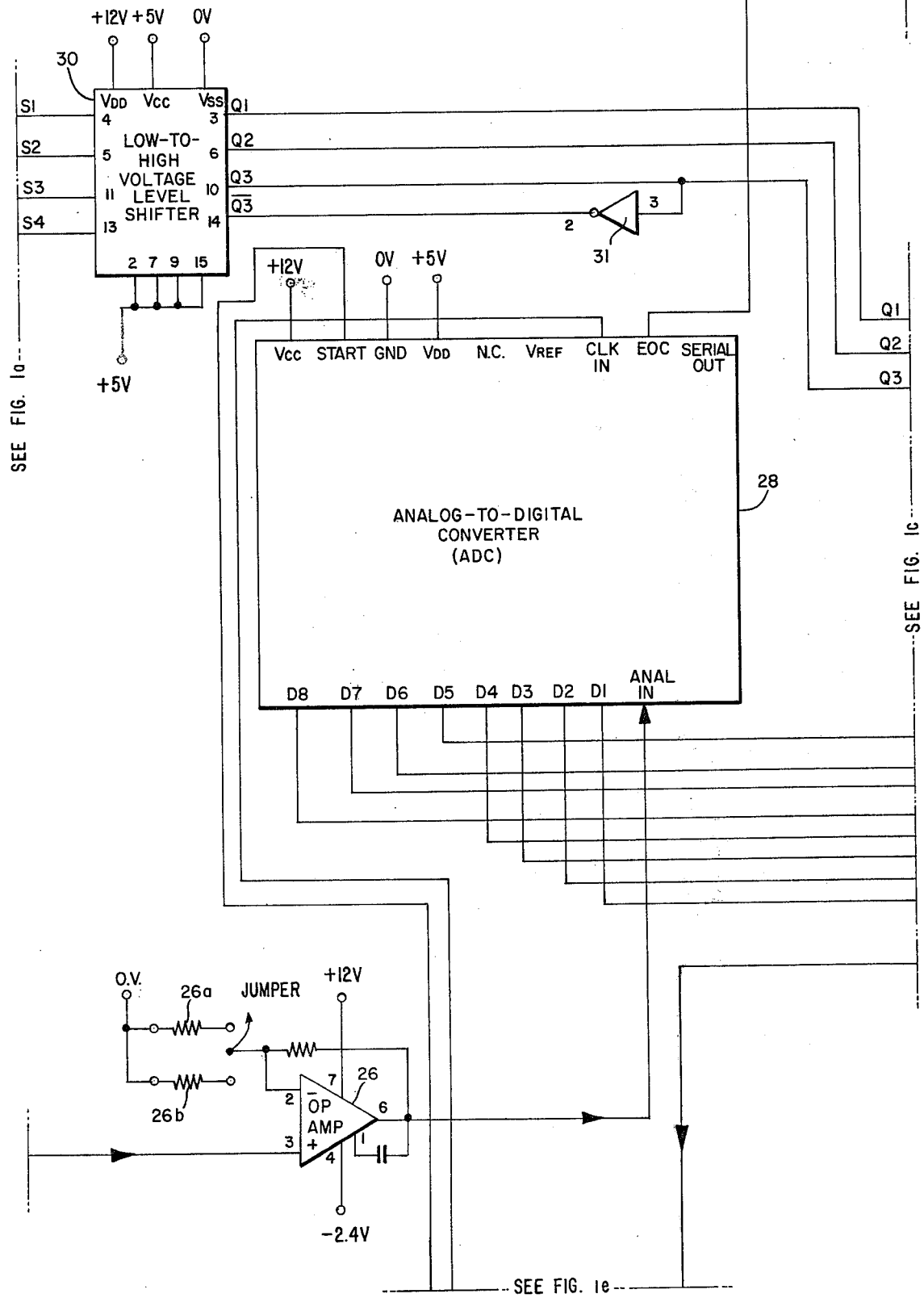

Referring to the processing section of FIG. 1b, the analog data provided consecutively by relays 11–18 (FIG. 1a), after power compensation and amplification, is further amplified by op amp 26. Op amp 26 is preferably a low noise, ultra stable, high-gain precision operational amplifier. Moreover, in the preferred embodiment, as shown in FIG. 1b, op amp 26 has its negative input terminal connected, via resistors 26a and 26b, to zero volts. Furthermore, a jumper is provided between the negative input terminal of op amp 26 and either one of the resistors 26a and 26b, so that op amp 26 may function with different, selectable amplification factors. This capability of functioning with different amplification factors equips the recording unit with flexibility to accommodate both extremely low temperature ranges and extremely high temperature ranges (or extremely low and high ranges of other parameters), while not losing precision during the analog-to-digital conversion process.

The output of op amp 26 is provided to the ANAL IN input of ADC 28 (FIG. 1b). ADC 28 performs a digital conversion of the analog input, and provides digital outputs D1–D8. An analog-to-digital conversion begins as a result of actuation of ADC 28, at its START terminal, by a DECODE OUT pulse from system clock generator 46 (FIG. 1e) in a manner which will be described below. At the end of the analog-to-digital conversion, ADC 28 issues, at terminal EOC, an end-of-conversion (EOC) pulse which, in a manner to be described below, causes the recording unit to make the next successive memory location in RAM 32 available to receive the next digital input data.

Figure 1C:
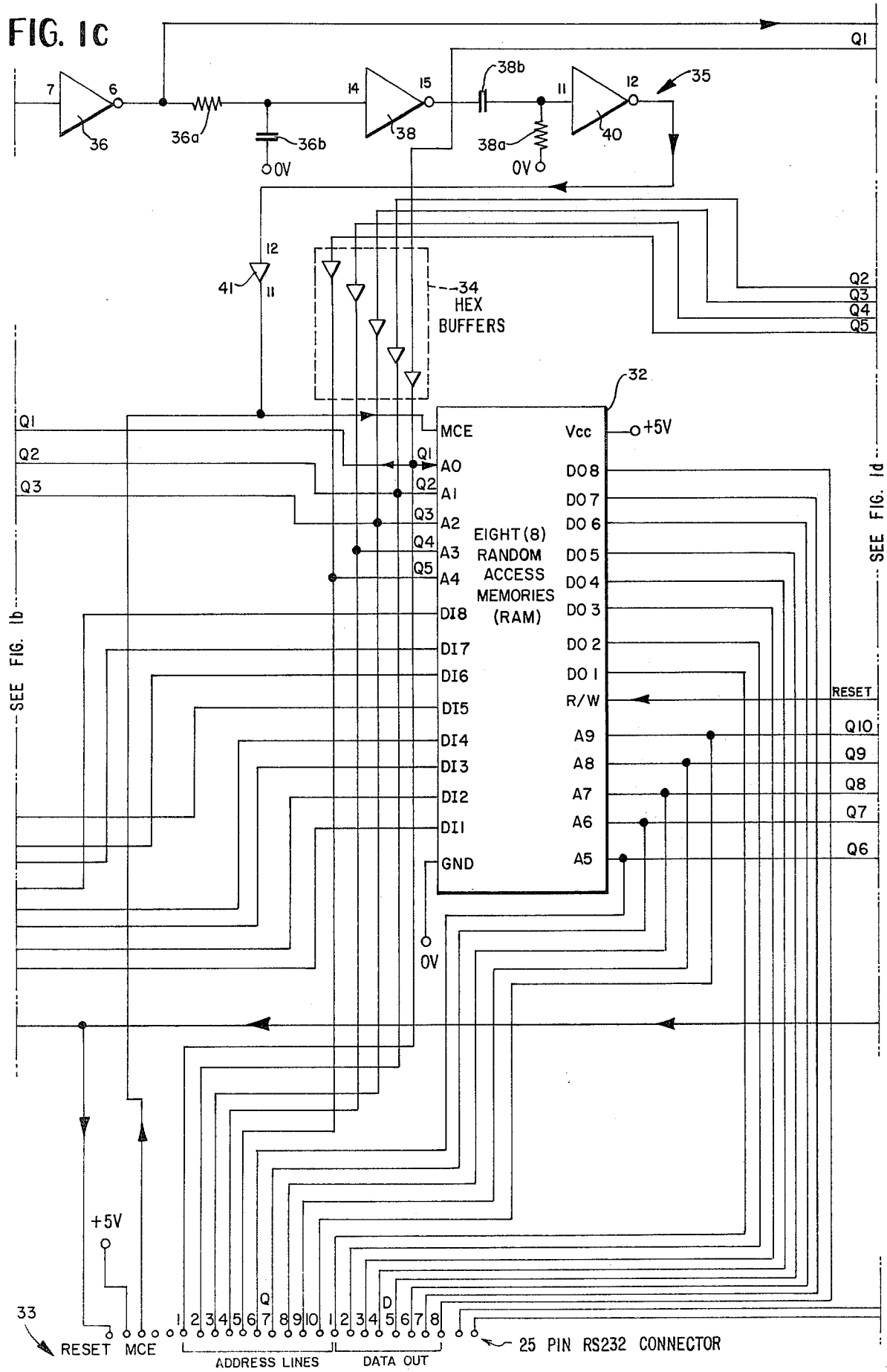
Figure 1D:
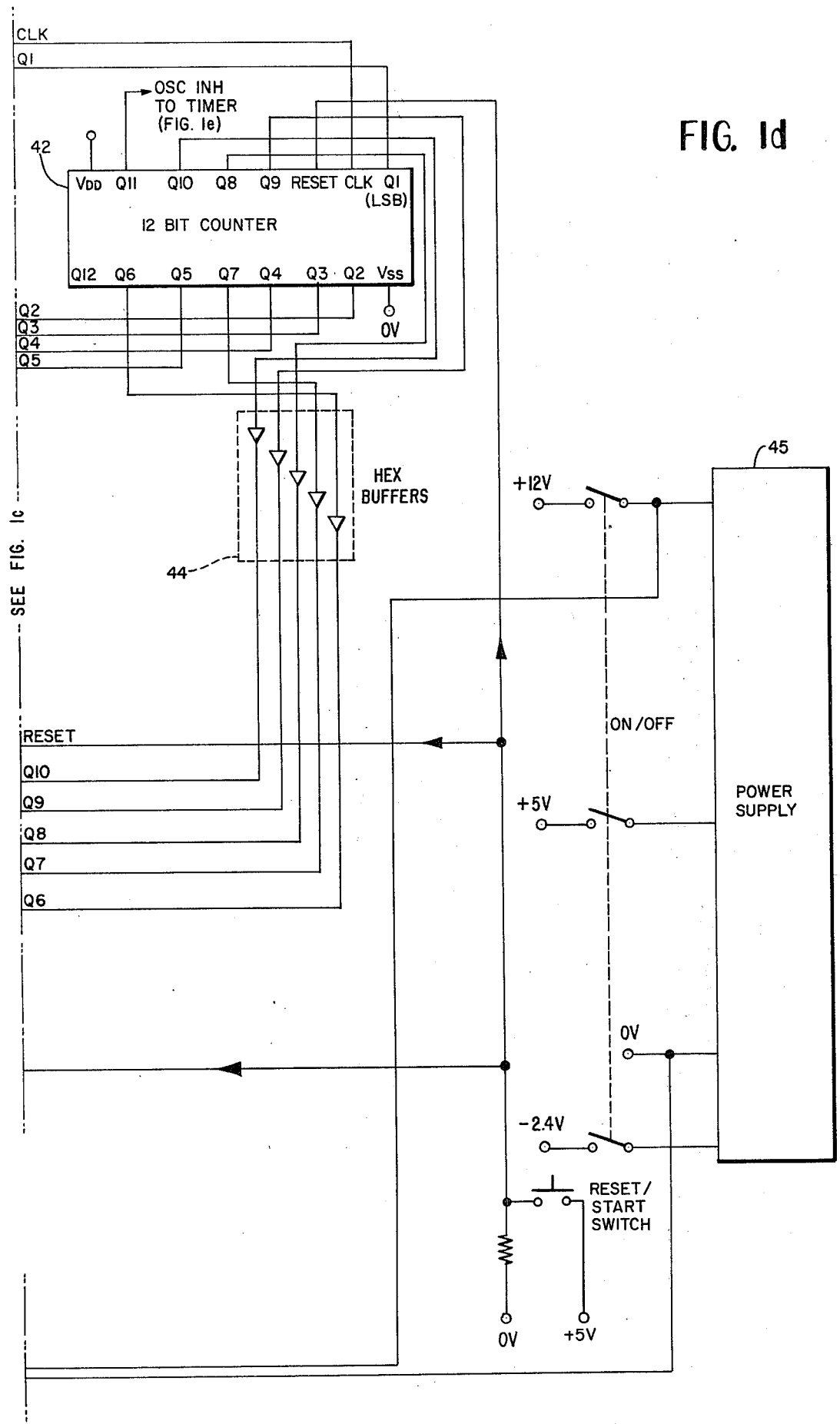
Figure 1E:
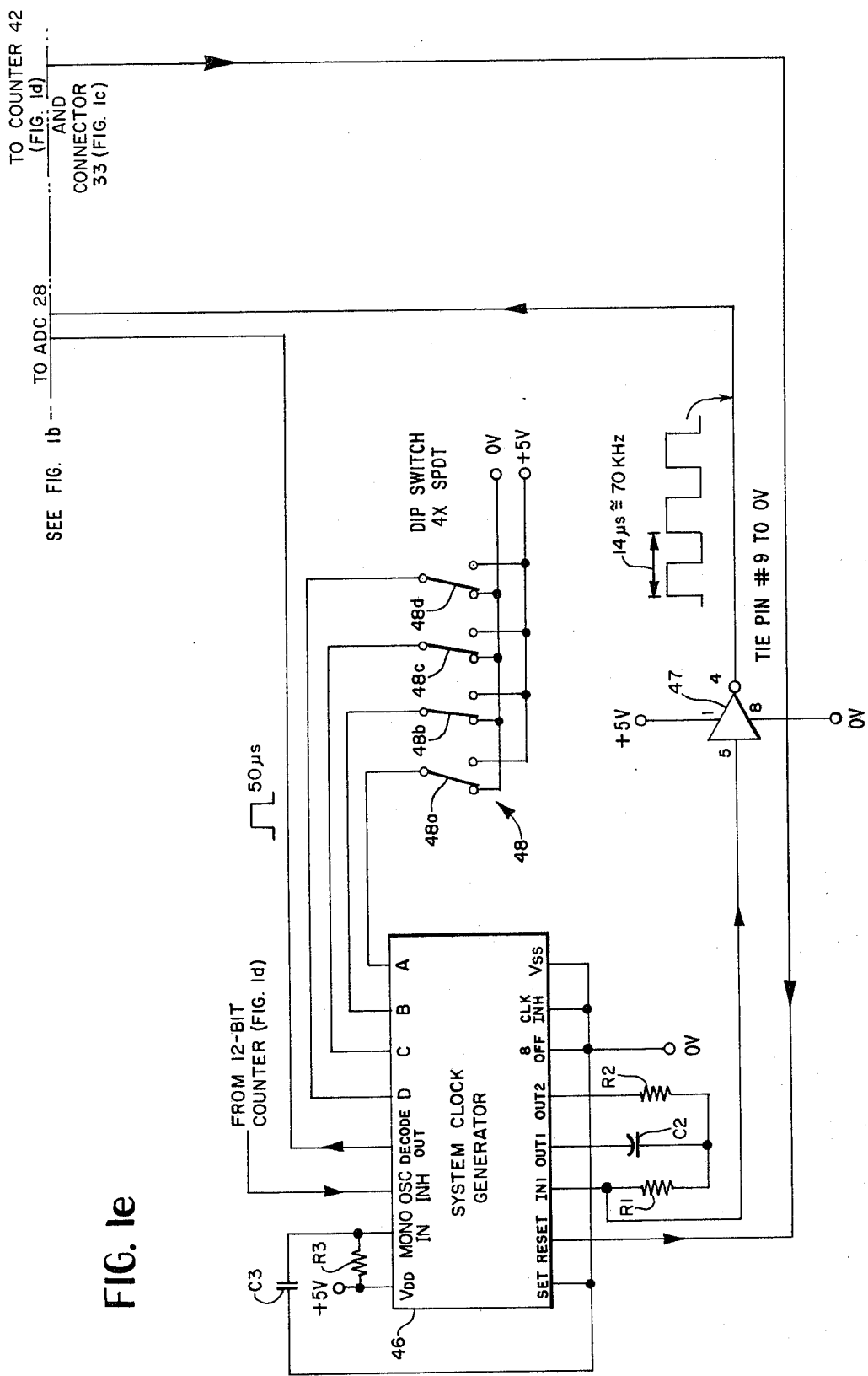

Analog-to-digital conversion is carried out in ADC 28 in accordance with a basic clocking signal received at terminal CLK IN of ADC 28, such basic clocking signal being provided by system clock generator 46 (FIG. 1e). Thus, the conversion rate of ADC 28 corresponds to the basic clock frequency (70 kHz, in the preferred embodiment) dictated by the system clock generator 46, but an analog-to-digital conversion takes place at time intervals determined by the DECODE OUT pulse generated at a selectable time interval (as will be seen below) by the clock generator 46.

Finally, ADC 28 is powered by supply voltages of +12 V. and +5 V., appearing at terminals $V_{CC}$ and $V_{DD}$, respectively. The GND terminal of ADC 28 is connected to zero volts. Whereas any conventional analog-to-digital converting device may be utilized, ADC 28 is preferably a Low-power 8-bit Successive Approximation ADC MN5065 or M5066 (manufactured by Micro Networks Corp. of Worcester, Massachusetts).

Further referring to FIG. 1b, there is provided a low-to-high voltage level shifter 30 which, in response to a 4-bit input Q1-Q3 and $\overline{Q3}$, provides data selection signals S1-S4, which in turn are applied as data selection inputs to data selector 20 (FIG. 1a), as previously discussed above. Low-to-high voltage level shifter 30 is a conventional shifting circuit which will shift a low-voltage digital-logic input signal having, for example, logical 1 = +5 V. and logical 0 = 0 V., to a higher-voltage output signal, for example, having logical 1 = +12 V. and logical 0 = 0 V. In the preferred embodiment, the low-to-high voltage level shifter is implemented by COS/MOS Quad Low-to-High Voltage Level Shifter RCA-CD40109B (manufactured by Radio Corporation of America). Accordingly, shifter 30—in this particular embodiment—receives an inverted Q3 ($\overline{Q3}$) input at terminal 14 thereof so as to comply with truth table requirements of the RCA-CD40109B Shifter.

Referring to FIGS. 1b and 1c, the 8-bit digital representation of the analog input data—that is, the digital data appearing at terminals D1-D8 of ADC 28—is provided to RAM 32. More specifically, each of eight memories in RAM 32 corresponds to a respective one of the digital outputs D1-D8 of ADC 28. Thus, during a first conversion cycle (selection period), the following steps take place: Firstly, analog data from a selected channel (as determined by data selector 20 of FIG. 1a) is provided, via power compensator 22, amplifier 24 and further amplifier 26, to ADC 28 wherein digital conversion takes place; then, ADC 28 provides digital outputs D1-D8 to eight respective memories in RAM 32 (FIG. 1c)—that is, D1 is provided to the first memory in RAM 32, D2 is provided to the second memory in RAM 32, etc; then, during the subsequent conversion (data selection) period, analog data from the next selected channel (as determined by data selector 20) is provided via compensator 22, amplifier 24 and amplifier 26 to ADC 28, wherein digital conversion again takes place; at this juncture, ADC 28 provides digital output D1-D8 to the second locations in eight respective memories in RAM 32 (D1 being stored in the second location in the first memory, D2 being stored in the second location in the second memory, etc.).

It will be recalled that, during the eighth selection period (conversion period), a short-circuit condition is established by thermal reed relay 18. This results in the provision of zero-voltage analog information to ADC 28, resulting in digital outputs D1-D8 corresponding to the zero voltage analog input. This "zero voltage" digital output D1-D8 is stored in the eighth location (during subsequent periods, in the sixteenth, twenty-fourth, etc. locations) in the corresponding eight memories in RAM 32. Thus, RAM 32 stores an indication of the drift or D.C. offset being experienced by the system during recording, and such indication of drift or offset is provided by the RAM 32 during "playback," thus permitting examination/evaluation of the extent of drift/offset experienced by the system.

During the playback operation, the RAM 32 provides respective digital outputs at terminals D01-D08 (FIG. 1c). The digital outputs are transmitted to eight corresponding pins contained in a 25-pin RS232 connector 33, which forms an electrical plug-type connection between the recording unit of FIGS. 1a-1e and the playback unit of FIGS. 2a-2b during the playback phase of operation.

The RAM 32 is equipped with addressing terminals A0-A9 for receiving corresponding address inputs Q1-Q10. Inputs Q1-Q5 are received at terminals A0-A4 by way of hex buffers 34, while inputs Q6-Q10 are received at terminals A5-A9 by way of hex buffers 44 (FIG. 1d). Whereas any conventional hex buffers may be employed, hex buffers 34 and 44 are preferably Hex Non-Inverting 3-State Buffers MC14503B (manufactured by Motorola Semiconductors of Phoenix, Arizona).

Address inputs Q1-Q10 define which of the locations in RAM 32 is to receive and store data. That is to say, during the first conversion cycle, the outputs D1-D8 of ADC 28, which outputs are a digital representation of analog input data received over channel CH1, are stored in the first location in each of the eight memories, respectively, of RAM 32. Address inputs Q1-Q10, at this juncture, take on the value 0000000000, indicating that the digital data D1-D8 for the first channel are to be stored in the first locations in the eight memories, respectively, of RAM 32. Then, during the second conversion period, the outputs D1-D8 of ADC 28 are digital representations of the analog input data received from channel CH2. Thus, at this juncture, address inputs Q1-Q10 take on the value 0000000001, indicating that the digital data is to be stored in the second location in the eight memories, respectively, of RAM 32.

It is to be noted that address inputs Q1-Q3 coincide with selection of one of the eight low thermal reed relays 11-18 by data selector 20 (FIG. 1a). In fact, further referring to FIG. 1c, it will be noted that address inputs Q1-Q3 not only are supplied to terminals A0-A2 of RAM 32, but also are supplied to terminals 3, 6 and 10 of low-to-high voltage level shifter 30 (FIG. 1b). The logical complement of address input Q3—that is, $\overline{Q3}$—is supplied to terminal 14 of shifter 30, for reasons previously stated.

As discussed above, address inputs Q1, Q2 and Q3, and input $\overline{Q3}$—after shifting in level shifter 30—form data selection inputs S1-S4, in response to which data selector 20 (FIG. 1a) issues an actuating signal on a corresponding one of terminals C1-C8 (such as terminal C1), so as to actuate a solenoid (such as solenoid 11d) within a selected one of the thermal reed relays (such as relay 11).

The RAM 32 has an R/W terminal for receiving a RESET signal from the system clock generator 46 of FIG. 1e. The RESET signal is effective for placing the RAM 32 in a "read" mode, so as to permit output of the digital representations of the analog channel data from RAM 32 to the playback unit via pin connector 33 (FIG. 1c). As will be seen further below, the RESET signal is generated as a result of actuation of a RESET switch (FIG. 1d). Such switch is actuated by the operator in order to initiate playback of recorded data. Thus, the RESET signal is provided, not only to the RAM 32, but also to the 12-bit counter 42 (FIG. 1d) and the system clock generator 46 (FIG. 1e). In response to the RESET signal, the counter 42 and system clock generator 46 are placed in the reset (cleared) state, and are disabled. This is due to the fact that, in the playback mode of operation, control of the RAM 32 will originate in the playback unit itself, as will be seen further below.

The RAM 32 also has an MCE terminal for receiving a memory chip enable (MCE) signal when digital conversion of the analog information has been completed. More specifically, referring to FIG. 1b, once ADC 28 completes digital conversion of given analog input data, an EOC pulse is issued from the EOC terminal of ADC 28. This EOC pulse is provided to a conditioning network 35, consisting of hex buffers 36, 38 and 40, resistors 36a and 38a, and capacitors 36b and 38b. The conditioning network 35 conditions the EOC pulse by inducing delays, resulting from the RC networks made up of resistors 36a, 38a and capacitors 36b, 38b. Such delay is introduced in order to avoid "race" problems with respect to the application of the EOC pulse to the MCE terminal of the RAM 32 (FIG. 1c).

Thus, after conversion in ADC 28 (FIG. 1b) has been completed, the EOC pulse—after some delay in the conditioning network 35—is introduced, via amplifier 41, at the MCE terminal of RAM 32, and storage of digital data D1-D8 (from ADC 28) in the RAM 32 is enabled. It is to be noted that the MCE terminal of RAM 32 is also connected to one of the pin connections of the connector 33, so as to receive an MCE pulse from the playback unit, indicating that playback of digital data stored in the RAM 32 is to be performed. This will be subsequently discussed in connection with description of the playback unit structure and operation.

It is to be noted that RAM 32 may be implemented by any conventional random access memory, but that each of the eight memories of RAM 32 is preferably an HM-6508 1024×1 CMOS RAM (manufactured by Harris Semiconductor Products Division).

Finally, the EOC ouput of ADC 28 (FIG. 1b) is provided to hex buffer 36 (FIG. 1c), the output of which (without being) passed through the remainder of the conditioning network 35) is provided as a clock (CLK) input to the 12-bit counter of FIG. 1d. This also will be discussed in more detail below.

Referring to FIG. 1d, control of the data selection function performed by data selector 20 (FIG. 1a), and addressing of the RAM 32 (FIG. 1c), are achieved by means of a 12-bit counter 42. Specifically, counter 42 generates outputs Q1-Q3 which, as previously described, form—after level shifting in low-to-high voltage level shifter 30 (FIG. 1b)—data selection inputs S1-S4 to the data selector 20. Counter 42 also provides outputs Q4-Q10 which, in conjunction with Q1-Q3 also provided by the counter 42, form address inputs A0-A9 to the RAM 32, also as previously described.

Counter 42 generates an output Q11 which functions as an oscillator inhibit (OSC INH) signal, which is provided to system clock generator 46 (FIG. 1e) when all locations in RAM 32 have been filled. This OSC INH input places the generator 46 in a disabled state, as will be discussed in detail below.

Counter 42 has a CLK terminal for receiving a clock (CLK) signal from the ADC 28 (FIG. 1b)—specifically, from the EOC terminal of ADC 28, via hex buffer 36. As previously discussed above, when the ADC 28 completes an analog-to-digital conversion, a signal is generated at the terminal EOC of ADC 28, and the signal is provided, via hex buffer 36 (FIG. 1c), to the counter 42 at its CLK terminal. Receipt of the CLK signal advances the count of the 12-bit counter 42 and, since Q1-Q3 are the three least significant bits of the counter outputs Q1-Q10, receipt of the CLK signal by counter 42 effectively increments the data selection input S1-S4 to data selector 20 (FIG. 1a). As a result, the data selector 20 selectively actuates a next successive one of the thermal reed relays 11-18. At the same time, receipt of the CLK signal by counter 42, and the resulting incrementing of the contents thereof (Q1-Q10), results in transfer of memory access to the next successive storage location in the RAM 32 (FIG. 1c).

Thus, to summarize, completion of a conversion cycle in the ADC 28 (FIG. 1b) results in the generation of the EOC signal, which in turn causes advancement of the memory address to the next successive storage location in the RAM 32 (FIG. 1c), and advancement of the data selector 20 (FIG. 1a) so as to change input selection to the next successive channel. Since input channel selection is governed by the relatively slow electromechanical operation of the reed relays 11-18, and since corresponding memory selection is achieved by relatively quick electronic means, the possibility exists that a "race" problem may occur between the relatively quick RAM 32 and the relatively slow reed relays 11-18. Therefore, as mentioned earlier, a conditioning network 35 (FIG. 1c)—made up of hex buffers 36, 38, 40, resistors 36a, 38a, and capacitors 36b, 38b, having inherent RC time delay built in—is provided between the EOC terminal of ADC 28 and the CLK terminal of 12-bit counter 42 (FIG. 1d). Thus, the previously mentioned possibility of "race" problems developing between the relays 11-18 and the RAM 32 has been eliminated.

Whereas any conventional 12-bit counter having the above-described functions may be employed, counter 42 is preferably 12bit Binary Counter MC14040B (manufactured by Motorola Semiconductors of Phoenix, Arizona).

Further referring to FIG. 1d, the recording unit is provided with a RESET/START switch connected, at one end, to a +5 volt D.C. source, and connected at the other end to the RESET terminal of 12-bit counter 42, to the R/W terminal of RAM 32 (FIG. 1c), to the RESET terminal of system clock generator 46 (FIG. 1e), and to the playback unit (via connector 33). When the RESET/START switch remains in the open position, zero volts is applied, via an unidentified resistor, to the aforementioned terminals. More specifically, the zero volts supplied, via the unidentified resistor, to the R/W terminal of RAM 32 place RAM 32 in the "write" mode, and accordingly data storage may take place in the recording unit. However, upon actuation of the RESET/START switch, +5 volts is applied to each of the aforementioned terminals, causing reset (clearing) of the 12-bit counter 42 (FIG. 1d) and system clock generator 46 (FIG. 1e), and also causing the RAM 32 to be placed in the "read" mode. Accordingly, the counter 42 and clock generator 46 of the recording unit are disabled, and synchronization is turned over to the playback unit which, in a manner to be described further below, accesses the RAM 32 (which is in the "read" mode) so as to cause read out of data previously recorded during the playback phase of operation.

Further referring to FIG. 1d, there is depicted a power supply 45, having three unidentified ganged switches connected thereto, representing the ON/OFF switch of the recording unit. Upon actuation of the ON/OFF switch by the operator, power supply 45 is effective to provide the +12 volt, +5 volt and −2.4 volt D.C. voltages necessary for operation of the unit.

Referring to FIG. 1e, the recording unit of the system includes a system clock generator 46 for controlling and synchronizing the operation of the recording unit in general, and the operation of the ADC 28 (FIG. 1b) in particular. Although any conventional system clock generator having the characteristics described herein may be employed, the system clock generator 46 of FIG. 1e preferably is Programmable Timer MC14536B (manufactured by Motorola Semiconductors of Phoenix, Arizona).

The system clock generator 46 of FIG. 1e is associated with a DIP switch 48. By means of selective actuation of the members 48a-48d of switch 48, a coded input defining a desired main clock pulse rate may be provided to the system clock generator 46 at its terminal A-D. Thus, switch 48 controls the main clock pulse rate—for example, among the period values 0.5, 1, 2, 4, 8 . . . seconds—so that a main clock pulse, appearing at terminal DECODE OUT of the generator 46 is generated once every so many seconds (as selected). This main clock pulse is, as previously mentioned, applied to the START input terminal of ADC 28 (FIG. 1b), indicating the start of a new conversion period. Thus, the frequency of analog-to-digital conversion is controlled in accordance with the selected period value 0.5, 1, 2, . . . seconds. In addition, and as a result, the frequency of generation, by ADC 28, of the EOC pulse is also controlled. As previously explained, the ADC 28 generates the EOC pulse to indicate end of a previous conversion period, and this EOC pulse is supplied to counter 42 (FIG. 1d), resulting in turn in advancement of counter 42 so as to achieve a new selection of input relays 11-18, and—after a short delay—selection of a new storage location in RAM 32 via initiation of memory chip enable (MCE).

Moreover, the system clock generator 46 is connected—at its MONO IN terminal—to resistor R3 and capacitor C3, which form a timing circuit which controls the duration of the DECODE OUT pulse provided to the ADC 28 (FIG. 1b). In the preferred embodiment, the duration of the DECODE OUT pulse is 50 microseconds, and—as previously discussed—this DECODE OUT pulse is generated every so many seconds (0.5, 1, 2, . . . ) as indicated by the DIP switch 48 (which is preset by the operator in accordance with the desired scan time and conversion period).

The system clock generator 46 is provided with an on-chip RC oscillator formed by the resistors R1, R2 and capacitor C2 connected to the terminals IN1, OUT2 and OUT1, respectively, of the generator 46. The operation of the generator 46 in conjunction with the on-chip RC oscillator determines the basic clock frequency (preferably, around 70 kHz) to be used by the ADC 28 (FIG. 1b) in performing its analog-to-digital conversion function. As indicated in FIG. 1e, this basic clock frequency—represented by a train of pulses (preferably, 14 microseconds per cycle)—is provided to the ADC 28 (FIG. 1d) via the hex buffer 47 (FIG. 1e), the latter being of the same type as, or identical to, hex buffers 36, 38 and 40 (discussed above with respect to FIG. 1c). The train of pulses (again, preferably 14 microseconds per cycle) establishes a "window" by which the ADC 28 is able to perform precise analog-to-digital conversion of the analog data received, during a scan period, over the selected channel.

The terminal OSC INH of system clock generator 46 receives, as previously mentioned, the Q11 output of the 12bit counter 42 (FIG. 1d). Thus, when bits Q1-Q10 of the counter 42 overflow, "turning on" bit Q11, this condition is indicated at the OSC INH input of generator 46, and the on-chip RC oscillator (R1, C2, R2) is inhibited. This effectively halts the generation of the basic clock signal utilized in the ADC 28 (FIG. 1b), effectively disabling the ADC 28, since all of the storage locations in RAM 32 (FIG. 1c) have been filled.

Figure 2A:
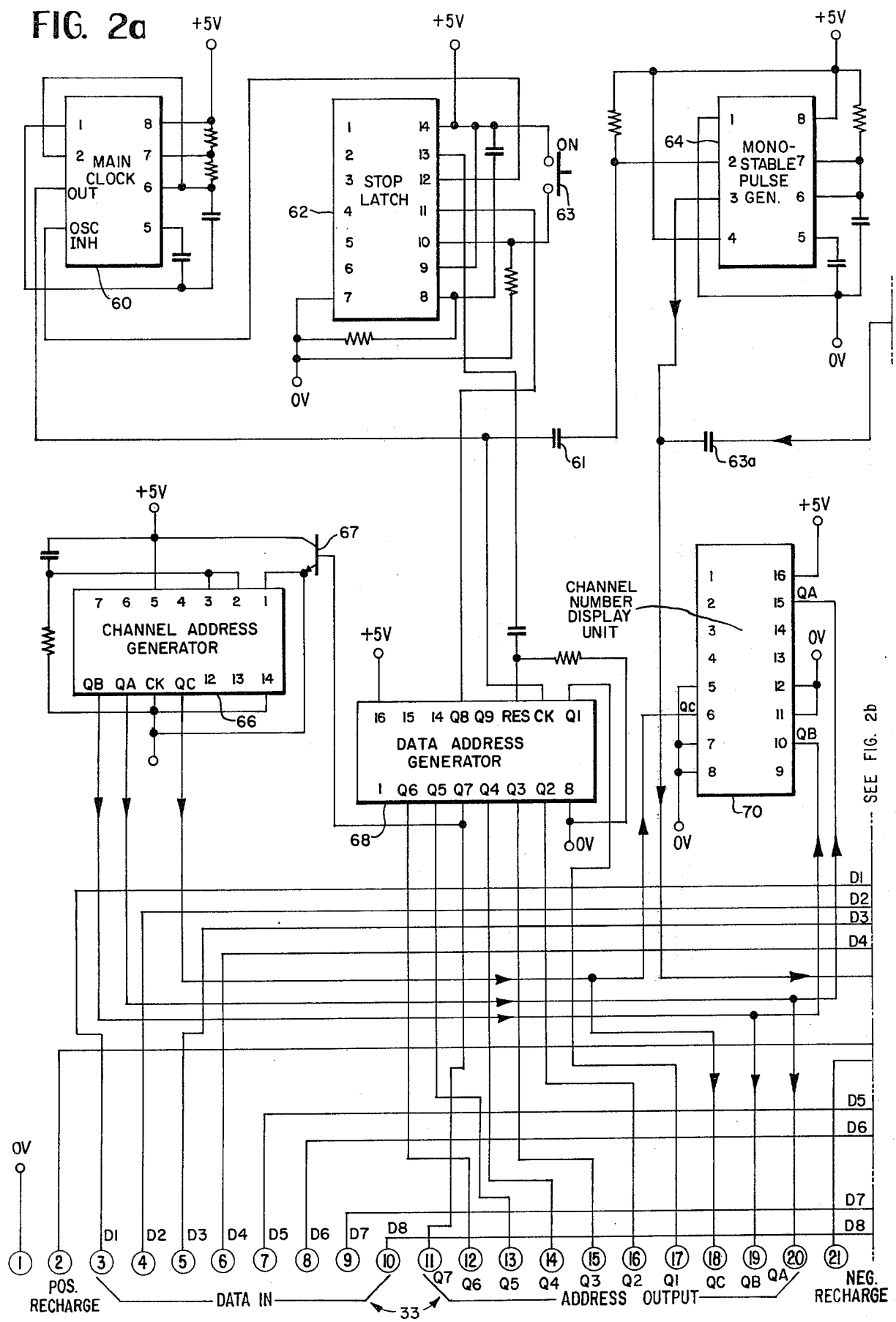

FIGS. 2a-2b are diagrammatic representations of a preferred embodiment of the playback unit of the remote temperature-pressure recording system of the invention.

The playback unit of the recording system generally comprises, with reference to FIG. 2a, a main clock 60, a stop latch circuit 62, a monostable pulse generator 64, a channel address generator 66, a data address generator 68, and a channel number display unit 70; and, with reference to FIG. 2b, the system further comprises a monostable pulse generator 72, a power supply 74 and associated bridge circuit 76, latch circuits 78 and 80, and a digital-to-analog converter (DAC) 82.

In general, the playback unit of the recording system operates synchronously, as controlled by the main clock 60, to provide channel address information by means of channel address generator 66, and data address information by means of data address generator 68. The channel address information is provided to a channel number display unit 70 which displays the particular channel relative to which recorded information is being read from memory for playback. In addition, the channel address generator 66 and data address generator 68 provide address outputs QA-QC and Q1-Q7, respectively, such address outputs being provided—via ADDRESS IN of the connector 33 (FIG. 1c)—to the address terminals A0-A9 of the RAM 32. Thus, it is to be noted that QA-QC and Q1-Q7 generated in the playback unit of FIG. 2a during the playback phase of operation correspond to the address inputs Q1-Q3 and Q4-Q10, respectively, generated by the counter 42 (FIG. 1d) during the recording phase of operation of the system.

As a result of being addressed, at terminals A0-A9, with the channel and data address information QA-QC and Q1-Q7, respectively, the RAM 32 (FIG. 1c) reads out data at terminals D01-D08, such outputted data being provided via the DATA OUT pins of the connector 33 as DATA IN or D1-D8 (FIG. 2a). The data D1-D4 is provided to the latch circuit 78 (FIG. 2b), while the data D5-D8 is provided to the latch circuit 80.

More specifically, during the playback phase of operation, main clock 60 generates—at its OUT terminal—a series of square wave pulses which are provided, via capacitor 61 (which converts the square wave pulse to a "spike"-type pulse), to terminal 2 of monostable pulse generator 64. As a result, terminal 3 of generator 64 goes "high" for a defined period of time (preferably, about 50 microseconds), thus providing an MCE signal both to the RAM 32 (via connector 33—FIG. 1c), and (via capacitor 63) to terminal 2 of monostable pulse generator 72 (FIG. 2b). As a result of provision of the MCE input to RAM 32 (FIG. 1c), RAM 32 is enabled for a "read" operation.

As mentioned previously, channel address generator 66 and data address generator 68 provide QA-QC and Q1-Q7, as address inputs, to the RAM 32, so as to read data from the corresponding storage location in RAM 32. At the same time, the particular channel, with respect to which data is being read and displayed, is visually indicated on channel number display unit 70.

Referring to FIG. 2b, monostable pulse generator 72, in response to reception of the MCE input at terminal 2 thereof, responds by causing terminal 3 of generator 72 to go "high" for a prescribed period of time (preferably, about 20 microseconds), so as to enable latch circuits 78 and 80 (at their G terminals). Latch circuits 78 and 80 respond to monostable pulse generator 72 by latching data D1-D4 and D5-D8, respectively, provided by RAM 32 (FIG. 1c), via connector 33 (see DATA IN of FIG. 2a).

Latch circuits 78 and 80 latch, or hold, the data D1-D8 for as long as is necessary for digital-to-analog converter (DAC) 82 to perform analog conversion. The input data D1-D8 is provided, to DAC 82, as inputs $\overline{Q1}$ ..., $\overline{Q4}$ from latch circuit 78 and corresponding inputs $\overline{Q1}$, ..., $\overline{Q4}$ from latch circuit 80.

DAC 82 performs digital-to-analog conversion of the digital inputs, and provides—at terminal 12 thereof—an analog output to a plotter (not shown). Moreover, gain adjustment resistors 82a-82d are provided at the output of DAC 82 in order to adjust the gain circuitry of DAC 82 so as to coincide with the specifications of the particular plotter employed.

Returning to FIG. 2a, once all locations, in RAM 32 (FIG. 1c), for a particular channel—that is a particular value of QA-QC outputs of channel address generator 66—have been "read," the Q7 output of data address generator 68 causes the base of NPN transistor 67 to go "high," resulting in input of a clock signal to the channel address generator 66 at the CK terminal thereof. This causes advancement of generator 66, so that generator 66 now indicates the next channel for which data is to be "read" from RAM 32 (FIG. 1c).

Furthermore, data address generator 68—via its Q8 output—places stop latch circuit 62 in a "waiting" mode of operation. Moreover, stop latch circuit 62, via its terminal 12, actuates the OSC INH input of main clock 60, thus placing the main clock 60 in a "waiting" state also.

Upon operator actuation of switch 63, stop latch circuit 62 reactivates main clock 60, causing return to the "playback" mode of operation, and the "playback" procedure continues as previously described, but this time for the next channel's data.

Referring to FIG. 2b, there is shown a CHARGE/PLAYBACK switch connected between a 117 volt A.C. source and a transformer T. When the aforementioned switch is placed in the CHARGE mode of operation, an A.C. voltage is applied across step-down transformer T to a diode bridge circuit 76. The diode bridge circuit 76 converts the A.C. signal to D.C., and this D.C. output signal is provided via connector 33 (FIG. 2a) to the recording unit (FIGS. 1a-1d) for the purpose of recharging the batteries of the recording unit.

Moreover, when the CHARGE/PLAYBACK switch of FIG. 2b is placed in the PLAYBACK position—that is, so as to designate operation of the system in the "playback" mode of operation—the 117 volt A.C. power source is again connected, via step-down transformer T, to the diode bridge circuit 76, so as to recharge the batteries of the recording unit (FIGS. 1a-1d). At the same time, however, the lowermost end of the primary coil of transformer T is connected to power supply 74, which provides the necessary +5 volt, 0 volt, +15 volt and −15 volt D.C. voltages necessary for operation of the playback unit.

Numerous modifications and adaptations of the system of the invention will be apparent to those skilled in the art and thus it is intended by the appended claims to cover all such modifications and adaptations which fall within the true spirit and scope of the invention.

I claim:

1. A remote recording and playback system comprising a recording unit for recording analog data received virtually simultaneously over a plurality of analog input channels, and a playback unit for playing back said recorded analog data for a given one of said plurality of analog input channels;

said recording unit comprising:
counting means for counting through a plurality of count values,
scanner means for sequentially scanning said plurality of analog input channels in succession and comprising a data selector responsive to said count values for issuing corresponding selection signals so as to select a respective analog data sample from each respective one of said plurality of analog input channels, and for providing said selected respective analog data samples as sequential respective analog outputs,
first conversion means for receiving said sequential respective analog outputs, and for converting said sequential respective analog outputs to corresponding digital respresentations thereof, and
memory means for receiving and storing said corresponding digital representations of said sequential respective analog outputs;

said playback unit comprising:
accessing means for accessing said memory means to read out said digital representations of said sequential respective analog output corresponding to said given one of said plurality of analog input channels,
second conversion means for converting said digital representations read out to analog signals, and
display means responsive to said analog signals for providing a visual display of said recorded analog data for said given one of said plurality of analog input channels.

2. A remote recording and playback system according to claim 1, wherein said memory means comprises a plurality of storage locations, said count values through which said counting means counts comprising a plurality of multi-bit count value outputs through which said counting means counts up to a predetermined number corresponding to the number of said storage locations, said count value outputs having a plurality of lower bits identifying each respective analog input channel;
said data selector being responsive to said lower bits of said count value outputs for issuing said corresponding selection signals selecting corresponding ones of said analog input channels, and
said scanner means including a plurality of relays, at least one for each analog input channel and connected thereto, responsive to said corresponding selection signals for sequentially providing said respective analog data samples from said corresponding ones of said analog input channels to said first conversion means.

3. A remote recording and playback system according to claim 2, wherein said recording unit further comprises voltage level shifter means for receiving and voltage level shifting said lower bits of said count value outputs of said counting means prior to provision to said data selector.

4. A remote recording and playback system according to claim 2, wherein said respective count value outputs are provided to said memory means, said memory means comprising enabling circuitry responsive to said respective count value outputs for enabling corresponding respective ones of said plurality of storage locations in said memory means for storage of said digital representations of said sequential respective analog outputs from said scanner means.

5. A remote recording and playback system according to claim 2, wherein said first conversion means issues an end-of-conversion signal at the termination of conversion of each respective analog data sample, said counting means being responsive to said end-of-conversion signal for advancing said count value output thereof to said respective count value output having lower bits identifying said next successive analog input channel to be scanned.

6. A remote recording and playback system according to claim 2, wherein said first conversion means issues an end-of-conversion signal at the termination of conversion of each respective analog data sample, said memory means being responsive to said end-of-conversion signal for storing said digital representation of said analog data sample from said selected corresponding one of said analog input channels.

7. A remote recording and playback system according to claim 6, said recording unit further comprising conditioning circuit means connected between said first conversion means and said memory means for conditioning said end-of-conversion signal prior to provision to said memory means.

8. A remote recording and playback system according to claim 7, wherein said conditioning circuit means comprises at least one delay circuit.

9. A remote recording and playback system according to claim 7, wherein said conditioning circuit means comprises at least one hex buffer circuit.

10. A remote recording and playback system according to claim 1, further comprising amplifying means connected between said scanner means and said first conversion means for amplifying said sequential respective analog outputs of said scanner means prior to provision to said first conversion means, said amplifying means being operator adjustable to amplify said sequential respective analog outputs by a selected amplification factor, whereby to facilitate precise conversion of said sequential respective analog outputs in accordance with the range of variation of said recorded analog data received over said plurality of analog input channels.

11. A remote recording and playback system according to claim 2, wherein said data selector issues an additional selection signal, said system comprising an additional relay having a positive output terminal and a reference output terminal, and short-circuit means responsive to said additional selection signal from said data selector for connecting said positive output terminal to said reference output terminal so as to short-circuit said additional relay producing a zero-voltage output therefrom, said zero-voltage output being provided to said first conversion means so as to convert said zero-voltage output to a corresponding digital representation thereof, said memory means receiving and storing said digital representation of said zero-voltage output of said additional relay.

12. A remote recording and playback system according to claim 1, wherein said recording unit comprises system clock means for generating clock pulses, said first conversion means being responsive thereto for converting said sequential analog respective outputs to corresponding digital representations thereof at a rate in synchronization with said clock pulses.

13. A remote recording and playback system according to claim 1, wherein said scanner means scans each of said plurality of analog channels for a given scan time, said recording unit comprising clock means for generating scan pulses defining said given scan time.

14. A remote recording and playback system according to claim 13, wherein said recording unit comprises switch means connected to said clock means, and having a plurality of switch positions defining respective selectable scan times, for controlling said clock means to generate said scan pulses in accordance with said selected scan time.

15. A remote recording and playback system according to claim 1, wherein said memory means comprises a plurality of storage locations, and wherein said accessing means comprises a first counter for counting through a first plurality of count values to a first predetermined number corresponding to the number of said plurality of analog input channels, and a second counter for counting through a second plurality of count values to a second predetermined number, said first and second plurality of count values combining to identify each of said plurality of storage locations in said memory means, said memory means comprising enabling circuitry responsive to said respective first and second pluralities of count values for enabling corresponding respective ones of said plurality of storage locations in said memory means for playback of said respective analog data samples corresponding to said digital representations stored therein.

16. A remote recording and playback system according to claim 15, said playback unit comprising further display means responsive to said first plurality of count values for displaying the identity of each respective analog input channel with respect to which said respective analog data sample is played back.

17. A remote recording and playback system according to claim 15, wherein said playback unit comprises playback clock means for issuing playback clock pulses, said second counter being responsive thereto for counting through said second plurality of count values to said second predetermined number.

18. A remote recording and playback system according to claim 17, wherein said second counter issues a next-channel signal when said second plurality of count values coincides with said second predetermined number, said first counter being responsive to said next-channel signal to perform said counting operation, whereby to advance said first counter to said next count value of said first plurality of count values.

19. A remote recording and playback system according to claim 1, wherein said second conversion means comprises at least one latch circuit for latching said digital representations read out by said accessing means to produce at least one digital latch output, and a digital-to-analog converter circuit for converting said at least one digital latch output to analog form.

20. A remote recording and playback system according to claim 1, wherein said display means comprises a plotter.

21. A remote recording and playback system according to claim 1, wherein said playback unit comprises playback clock means for issuing playback clock pulses, monostable pulse generator means responsive to said playback clock pulses for issuing corresponding memory chip enable signals, and means for transmitting said memory chip enable signals to said memory means of said recording unit, said memory means of said recording unit being responsive thereto for enabling read out of said digital representations stored in said memory means.

22. A remote recording and playback system according to claim 21, said playback unit further comprising additional monostable plus generator means responsive to said memory chip enable signals from said monostable pulse generator means for issuing a data latch output, and latch means responsive to said data latch output of said additional monostable pulse generator means for latching said digital representations read out from said memory means of said recording unit.

23. A remote recording and playback system according to claim 1, said playback unit comprising further means responsive to visual display of all of said recorded analog data for said given one of said plurality of analog input channels for stopping operation of said playback unit, said playback unit including an operator-initiated restart button, said further means being responsive to actuation of said operator-initiated restart button for restarting said playback unit so as to cause said display means to provide a visual display of all of said recorded analog data for said one of said plurality of analog input channels next succeeding said given one of said plurality of analog input channels.

24. A remote recording and playback system according to claim 1, wherein said recording unit is battery-powered, said playback unit comprising means for recharging said recording unit battery.

25. A remote recording and playback system according to claim 24, wherein said recording unit and said playback unit comprise respective connecting means for connecting said recording unit to said playback unit.

26. A remote recording and playback system according to claim 1, wherein said recording unit and said playback unit comprise respective connecting means for connecting said recording unit to said playback unit.

27. A remote recording unit for recording respective analog data received virtually simultaneously over a plurality of corresponding analog input channels, said recording unit comprising:
counting means for counting through a plurality of multi-bit count value outputs to a predetermined number, said count value outputs having a plurality of lower bits identifying each respective analog input channel;
data selector means responsive to said lower bits of said count value outputs for issuing corresponding selection signals selecting corresponding ones of said analog input channels;
relay means, at least one for each analog input channel and connected thereto, responsive to said corresponding selection signals for sequentially providing said respective analog data samples from said corresponding ones of said analog input channels as sequential respective analog outputs;
conversion means for receiving said sequentially provided respective analog data samples from said corresponding ones of said analog input channels, and for converting said sequentially provided respective analog data samples to corresponding digital representations thereof; and
memory means for receiving and storing said corresponding digital representations of said sequentially provided respective analog data samples from said corresponding ones of said analog input channels.

28. A remote recording unit according to claim 27, wherein said recording unit further comprises voltage level shifter means for receiving and voltage level shifting said lower bits of said count value outputs of said counting means prior to provision to said data selector means.

29. A remote recording unit according to claim 27, wherein said memory means comprises a plurality of storage locations, and wherein said respective count value outputs are provided to said memory means, said memory means comprising enabling circuitry responsive to said respective count value outputs for enabling respective ones of said plurality of storage locations in said memory means for storage of said respective digital representations of said sequentially provided respective analog data samples from said corresponding ones of said analog input channels.

30. A remote recording unit according to claim 27, wherein said conversion means issues an end-of-conversion signal at the termination of conversion of each respective analog data sample, said counting means being responsive to said end-of-conversion signal for advancing said count value output thereof to said respective count value output having said lower bits identifying said next successive analog input channel to be scanned.

31. A remote recording unit according to claim 27, wherein said conversion means issues an end-of-conversion signal at the termination of conversion of each respective analog data sample, said memory means being responsive to said end-of-conversion signal for storing said digital representation of said analog data sample from said selected corresponding one of said analog input channels.

32. A remote recording unit according to claim 31, said recording unit further comprising conditioning circuit means connected between said conversion means and said memory means for conditioning said end-of-conversion signal prior to provision to said memory means.

33. A remote recording unit according to claim 32, wherein said conditioning circuit means comprises at least one delay circuit.

34. A remote recording unit according to claim 32, wherein said conditioning circuit means comprises at least one hex buffer circuit.

35. A remote recording unit according to claim 27, further comprising amplifying means connected between said relay means and said conversion means for amplifying said sequentially provided outputs of said relay means prior to provision to said conversion means, said amplifying means being operator adjustable to amplify said sequentially provided outputs by a selected amplification factor, whereby to facilitate precise conversion of said sequentially provided outputs in accordance with the range of variation of said recorded analog data received over said plurality of analog input channels.

36. A remote recording unit according to claim 27, wherein said relay means comprises a number of relays, said number of relays being greater than said plurality of analog input channels by one additional relay, and wherein said data selector means issues an additional selection signal, said one additional relay having a positive output terminal and a reference output terminal, said system comprising short-circuit means responsive to said one additional selection signal from said data selector means for connecting said positive output terminal to said reference output terminal so as to short-circuit said one additional relay producing a zero-voltage output therefrom, said zero-voltage output being provided to said conversion means so as to convert said zero-voltage output to a corresponding digital representation thereof, said memory means receiving and storing said digital representation of said zero-voltage output of said one additional relay.

37. A remote recording unit according to claim 27, wherein said recording unit comprises system clock means for generating clock pulses, said conversion means being responsive thereto for converting said sequentially provided respective analog data samples to corresponding digital representations thereof at a rate in synchronization with said clock pulses.

38. A remote recording unit according to claim 27, further comprising clock means for generating scan pulses defining a given scan time, said data selector means being responsive to said scan pulses for issuing said corresponding selection signals selecting said corresponding ones of said analog input channels in accordance with said scan time defined by said scan pulses.

39. A remote recording unit according to claim 38, wherein said recording unit comprises switch means connected to said clock means, and having a plurality of switch positions defining respective selectable scan times, for controlling said clock means to generate scan pulses in accordance with said selected scan time.

40. A playback unit for playing back previously recorded analog data received virtually simultaneously over a plurality of analog input channels and stored in a random access memory as successive digital representations of said received analog data, said random access memory comprising a plurality of storage locations, said previously recorded analog data being played back for a selected one of said plurality of analog input channels, said playback unit comprising:

first counter means for counting through a first plurality of count values to a first predetermined number corresponding to the number of said plurality of analog input channels, so as to produce respective count value outputs corresponding to and identifying each respective analog input channel;

second counter means for counting through a second plurality of count values to a second predetermined number corresponding to the number of successive storage locations, wherein said successive digital representations of said successively received analog data are stored so as to produce additional count value outputs;

accessing means responsive to said count value outputs of said first counter means and to said additional count value outputs of said second counter means for reading out said digital representations of said received analog data, corresponding to said analog input channel identified by said count value output of said first counter means, from storage locations in said random access memory as indicated by said count value output of said first counter means and said additional count output of said second counter means;

conversion means for converting said digital representations read out by said accessing means to analog signals; and display means responsive to said analog signals for providing a visual display of said analog data previously received over said analog input channel identified by said count value output of said first counter means.

41. A playback unit according to claim 40, wherein said playback unit comprises playback clock means for issuing playback clock pulses, said second counter means being responsive thereto for counting through said second plurality of count values to said second predetermined number.

42. A playback unit according to claim 41, wherein said second counter means issues a next-channel signal when said second plurality of count values coincides with said second predetermined number, said first counter means being responsive to said next-channel signal to perform said counting operation, whereby to advance said first counter means to said next count value of said first plurality of count values.

43. A playback unit according to claim 40, said playback unit comprising further display means responsive to said respective count value outputs from said first counter means for displaying the identity of each respective analog input channel with respect to which said respective analog data sample is played back.

44. A playback unit according to claim 40, wherein said conversion means comprises at least one latch circuit for latching said digital representations read out by said accessing means to produce at least one digital latch output, and a digital-to-analog converter converter circuit for converting said at least one digital latch output to analog form.

45. A playback unit according to claim 40, wherein said display means comprises a plotter.

46. A playback unit according to claim 40, wherein said playback unit comprises playback clock means for issuing playback clock pulses, monostable pulse generator means responsive to said playback clock pulses for issuing corresponding memory chip enable signals, and means for transmitting said memory chip enable signals to said random access memory, said random access memory of said recording unit being responsive thereto for enabling read out of said digital representations stored in said random access memory.

47. A playback unit according to claim 45, said playback unit further comprising additional monostable plus generator means responsive to said memory chip enable signals from said monostable pulse generator means for issuing a data latch output, and latch means responsive to said data latch output of said additional monostable pulse generator means for latching said digital representations read out from said random access memory.

48. A playback unit according to claim 40, said playback unit comprising further means responsive to visual display of all of said recorded analog data for said given one of said plurality of analog input channels for stopping operation of said playback unit, said playback unit including an operator-initiated restart button, said further means being responsive to actuation of said operator-initiated restart button for restarting said playback unit so as to cause said display means to provide a visual display of all of said recorded analog data for said one of said plurality of analog input channels next succeeding said given one of said plurality of analog input channels.

* * * * *